US012561009B2

(12) United States Patent
Sugie

(10) Patent No.: US 12,561,009 B2
(45) Date of Patent: Feb. 24, 2026

(54) ELECTRONIC APPARATUS HAVING OPERATION MEMBER FOR RECEIVING VARIOUS FORMS OF INPUT OPERATION

(71) Applicant: CANON KABUSHIKI KAISHA, Tokyo (JP)

(72) Inventor: Takashi Sugie, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/746,812

(22) Filed: Jun. 18, 2024

(65) Prior Publication Data

US 2025/0013315 A1     Jan. 9, 2025

(30) Foreign Application Priority Data

Jul. 4, 2023     (JP) ................................. 2023-110139

(51) Int. Cl.
G06F 3/02          (2006.01)
(52) U.S. Cl.
CPC .................................. G06F 3/0202 (2013.01)
(58) Field of Classification Search
CPC .................................................... G06F 3/0202
See application file for complete search history.

(56) References Cited

U.S. PATENT DOCUMENTS

2014/0267043 A1*   9/2014   Kaiser ..................... G06F 3/044
                                                                345/168
2024/0322824 A1*   9/2024   Nakae ....................... G06F 3/02

FOREIGN PATENT DOCUMENTS

JP            2014123430 A   *   7/2014   ........... H03K 17/955

* cited by examiner

*Primary Examiner* — Amit Chatly
(74) *Attorney, Agent, or Firm* — Cowan, Liebowitz & Latman, P.C.

(57)          ABSTRACT

An electronic apparatus capable of reducing erroneous detection of each input operation and variation in an operation detection state, while enabling various input operations with one operation member. The electronic apparatus comprising an operation member that is displaced according to user's operation; a movable electrode that is displaced according to displacement of the operation member; a fixed electrode fixed near the movable electrode while being electrically connected to ground; a sensor that is electrically connected to the movable electrode and detects a change in capacitance generated in the movable electrode; and a controller configured to switch, according to the displacement of the operation member, between a first state in which the movable electrode and the fixed electrode are electrically separated from each other and a second state in which the movable electrode and the fixed electrode are in contact with each other in a conductive manner.

12 Claims, 9 Drawing Sheets

400

400

400

510

505

500'

ELECTRONIC APPARATUS HAVING OPERATION MEMBER FOR RECEIVING VARIOUS FORMS OF INPUT OPERATION

BACKGROUND OF THE INVENTION

Field of the Invention

The present invention relates to an electronic apparatus, and more particularly, to an electronic apparatus having an operation member that receives various forms of input operations.

Description of the Related Art

Conventionally, as an electronic apparatus having an operation member that receives various forms of input operations, there is known an electronic apparatus that detects an input operation by a user by detecting a change in electrostatic capacitance generated in the electronic apparatus by an input operation of the user on the operation member. Specifically, a threshold value is set in advance for the amount of change in capacitance, and when the amount of change in capacitance exceeds the threshold value, the electronic apparatus receives a predetermined input operation.

In addition, an electronic apparatus that detects a change amount of capacitance in multiple stages is also disclosed.

For example, an electronic apparatus described in Japanese Laid-Open Patent Publication (kokai) No. 2014-123430 has a configuration for detecting a change in capacitance due to approach and separation of user's finger to and from an electrode unit mounted on an operation member of the electronic apparatus. The electrode unit is a movable electrode unit that can be displaced by a pressing operation on the operation member by user's finger. The electronic apparatus described above can also detect a change in capacitance caused by approach and separation between the movable electrode unit and a fixed electrode unit disposed in the electronic apparatus.

In addition, in the electronic apparatus disclosed in Japanese Laid-Open Patent Publication (kokai) No. 2014-123430, in order to simplify the configuration, both a change in capacitance based on a distance from the detected object and a change in capacitance based on a distance between electrodes due to a pressing operation are detected by one detection unit.

However, in Japanese Laid-Open Patent Publication (kokai) No. 2014-123430, one capacitance change detection unit detects a change in capacitance at a plurality of stages according to a plurality of user operations such as approach, separation, and pressing by user's finger with respect to the movable electrode unit. For this reason, in the technique of Japanese Laid-Open Patent Publication (kokai) No. 2014-123430, it is necessary to set a threshold value regarding the capacitance according to each of the user operations. In this case, it is needed to set a plurality of threshold values within the range of the change amount of the capacitance detectable by the electronic apparatus and within the range regarding the detection accuracy, but it is difficult to simultaneously secure a margin of the threshold value necessary to avoid detection of an operation without an operation intention and a difference between the threshold values to avoid confusion of a plurality of operations.

In addition, in the detection of the pressing operation, there is a difference in the change amount of the capacitance depending on the contact state of the user's finger with the operation member, and thus, there is a problem that the operation detection state varies.

SUMMARY OF THE INVENTION

The present invention provides an electronic apparatus capable of reducing erroneous detection of each input operation and variation in an operation detection state while enabling a plurality of input operations with one operation member.

Accordingly, the present invention provides an electronic apparatus comprising an operation member configured to be displaced according to user's operation, a movable electrode configured to be displaced according to displacement of the operation member, a fixed electrode fixed in a vicinity of the movable electrode in a state of being electrically connected to ground, a sensor configured to be electrically connected to the movable electrode and to detect a change in capacitance generated in the movable electrode, and a controller configured to perform control of entire the electronic apparatus according to a detection result by the sensor, wherein the controller switches, according to the displacement of the operation member, a state in the electronic apparatus to one of a first state in which the movable electrode and the fixed electrode are electrically separated from each other and a second state in which the movable electrode and the fixed electrode are in contact with each other in a conductive manner.

According to the present invention, it is possible to reduce erroneous detection of each input operation and variation in an operation detection state while enabling a plurality of input operations with one operation member.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
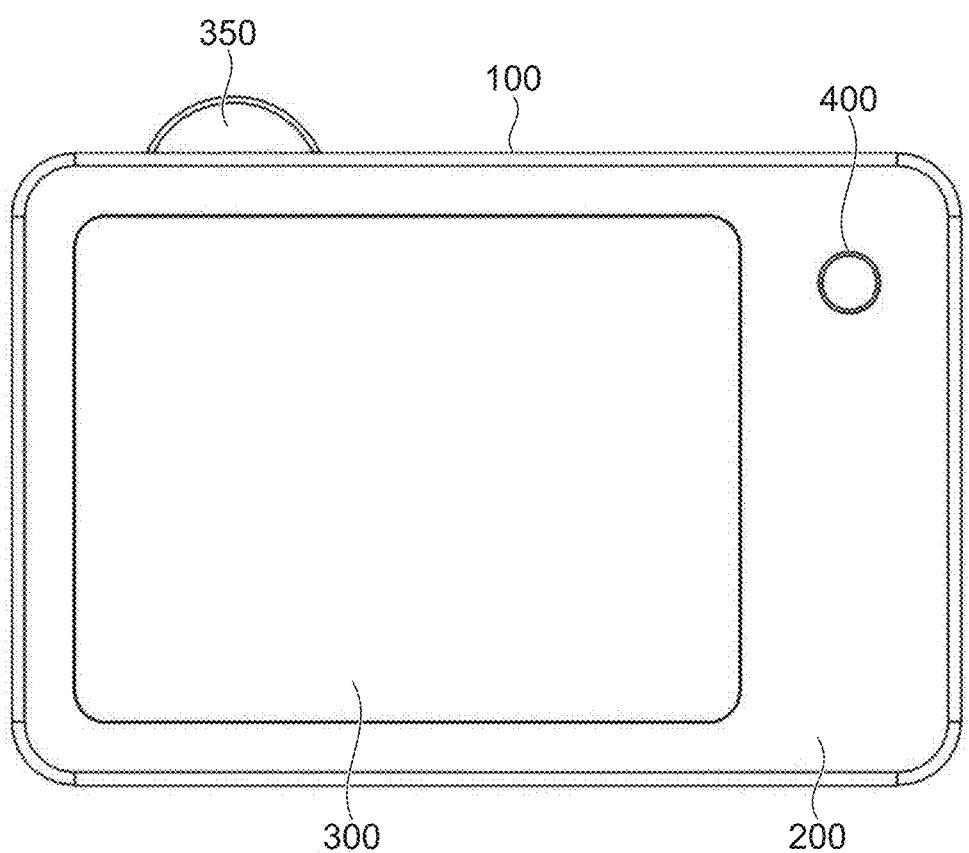
FIG. 1 is an external view of an electronic apparatus according to a first embodiment of the present invention.

FIG. 1 is an external view of an electronic apparatus 100 according to a first embodiment of the present invention.

The electronic apparatus 100 includes an outer housing 200 constituting an exterior of the electronic apparatus 100, a display device 300 disposed on the outer housing 200, a dial 350, and an operation unit 400.

The display device 300 is a liquid crystal display device, and displays information related to the electronic apparatus 100. The dial 350 and the operation unit 400 are used to perform an operation for changing control of the electronic apparatus 100. By using these components in combination, a user can operate the electronic apparatus 100 while checking the response of the electronic apparatus 100 via the display device 300.

In addition, the electronic apparatus 100 includes a CPU 100a (controller) (not shown) that controls the entire electronic apparatus 100 including the display device 300, the dial 350, the operation unit 400, and the like.

Hereinafter, the configuration of the operation unit 400 will be described with reference to FIGS. 2A, 2B, 3A, and 3B.

Figure 2A:
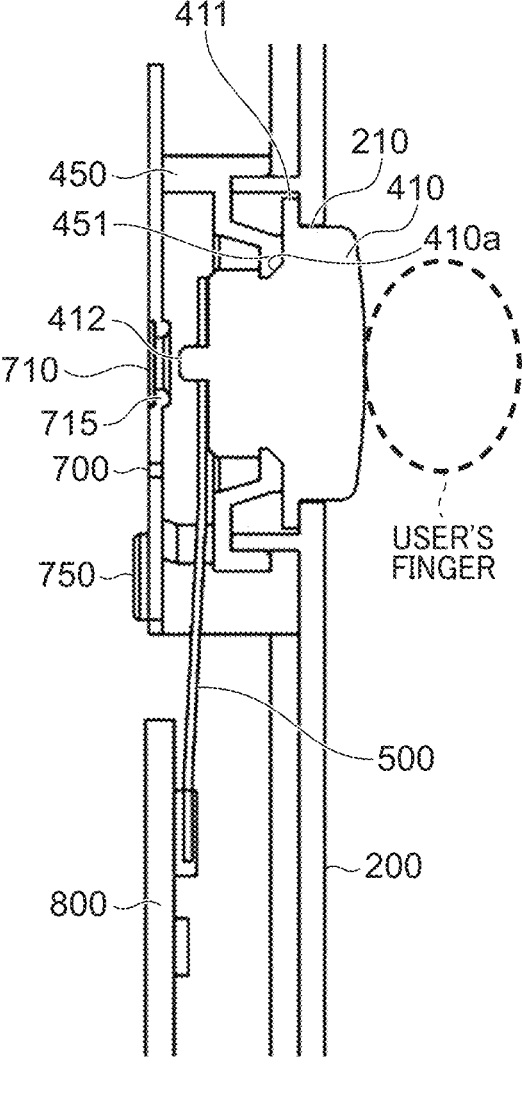
FIGS. 2A and 2B are cross-sectional diagrams showing an operation unit of the electronic apparatus in FIG. 1.
Figure 2B:
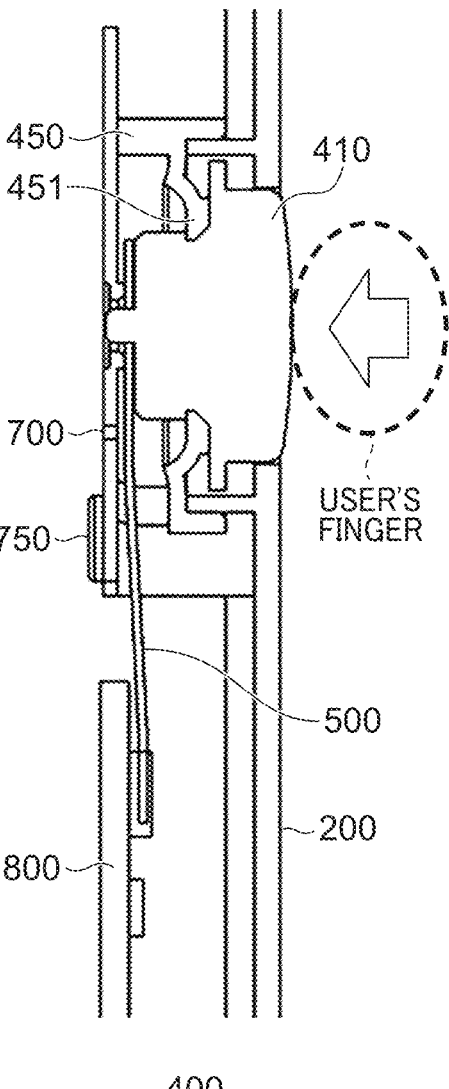
Figure 3A:
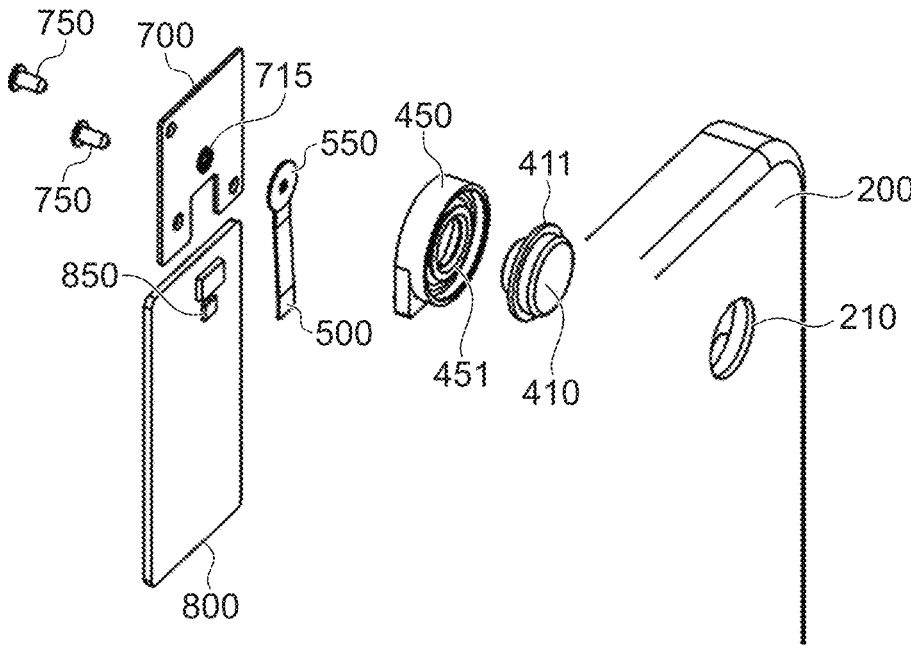
FIGS. 3A and 3B are exploded perspective diagrams showing the operation unit of the electronic apparatus in FIG. 1.
Figure 3B:
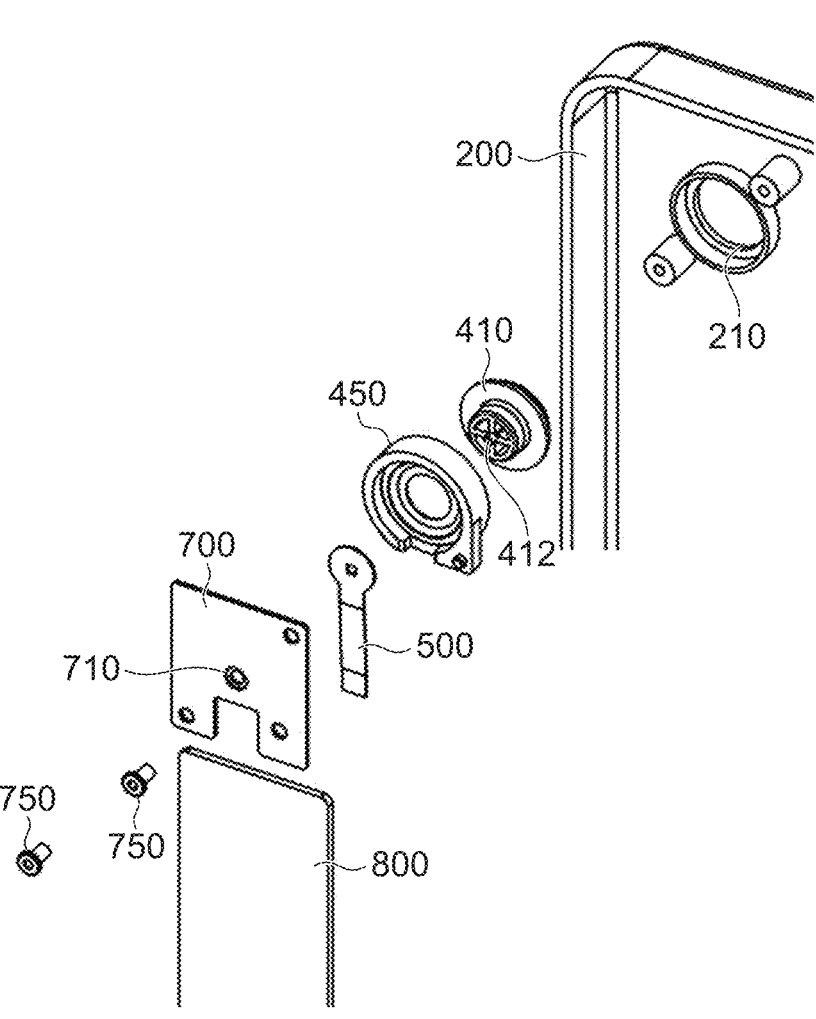

FIGS. 2A and 2B are cross-sectional diagrams showing the operation unit 400. FIGS. 3A and 3B are exploded perspective diagrams showing the operation unit 400.

FIG. 2A is a diagram showing a state of receiving a touch operation on the operation unit 400.

The operation unit 400 is a push button, and is disposed such that a key top 410 (operation member) is exposed in a button hole 210 which is an opening provided in the outer housing 200. On the outer periphery of the key top 410, a key flange 411 is formed. The key flange 411 comes into contact with the outer housing 200 to regulate the position of the key top 410. A key rubber 450 which is an elastic member is disposed on a back side (the left side in FIGS. 2A and 2B) of the key flange 411. The key rubber 450 includes a rubber engagement portion 451 that engages with the key top 410. The rubber engagement portion 451 engages with a groove portion 410a on the side surface of the key top 410 to hold the key top 410. When a pressing operation is performed on the key top 410 with user's finger, the key rubber 450 is elastically deformed to displace the key top 410. When the pressing of the key top 410 is released, the key rubber 450 is restored to the original shape, and the key top 410 is pushed back to the original position. The key rubber 450 is formed in a shape such that click feeling (tactile feedback) is given when a pressing operation is performed on the key top 410.

On the back surface (the surface facing left side in FIGS. 2A and 2B) of the key top 410, a button flexible circuit board 500 is disposed, and is bonded and held to the back surface of the key top 410 by a double-sided tape 550 (FIG. 3A). The button flexible circuit board 500 is electrically connected to an electronic substrate 800. The functions of the button flexible circuit board 500 and the electronic substrate 800 will be described later.

Further, on the back surface side (the left side in FIGS. 2A and 2B) of the button flexible circuit board 500, a receiving sheet metal 700 (fixed electrode) formed of a metal plate is disposed at a distance from the button flexible circuit board 500. The receiving sheet metal 700 is fixed in the vicinity of an electrode pattern 510 (described later) formed on the button flexible circuit board 500 in a state of being electrically connected to the ground in the inside of the outer housing 200 with a screw 750, and serves as a receiving surface (stopper) when the key top 410 is pressed. In other words, the receiving sheet metal 700 serves as a stopper to regulate the amount of displacement of the key top 410 in the displacement direction.

FIG. 2B is a diagram showing a state in which the key top 410 is pressed in and the button flexible circuit board 500 is in contact with the receiving sheet metal 700.

A key top boss 412 provided on the back surface of the key top 410 is engaged with the button flexible circuit board 500, and the pasting position of the button flexible circuit board 500 with respect to the key top 410 is aligned. Further, a sheet metal hole 710 is a hole for releasing the key top boss 412 when the key top 410 is pushed in.

As described above, the operation unit 400 (switching unit) switches, according to the displacement of the key top 410, the state between the button flexible circuit board 500 (in particular, an electrode pattern 510 to be described later) and the receiving sheet metal 700 to one of a state (FIG. 2A: a first state) in which the button flexible circuit board 500 and the receiving sheet metal 700 are electrically separated from each other and another state (FIG. 2B: a second state) in which the button flexible circuit board 500 and the receiving sheet metal 700 are in contact with each other in a conductive manner.

Next, a button flexible circuit board 500' according to a prior art and the button flexible circuit board 500 according to the present embodiment will be described with reference to FIGS. 4 and 5.

Figure 4:
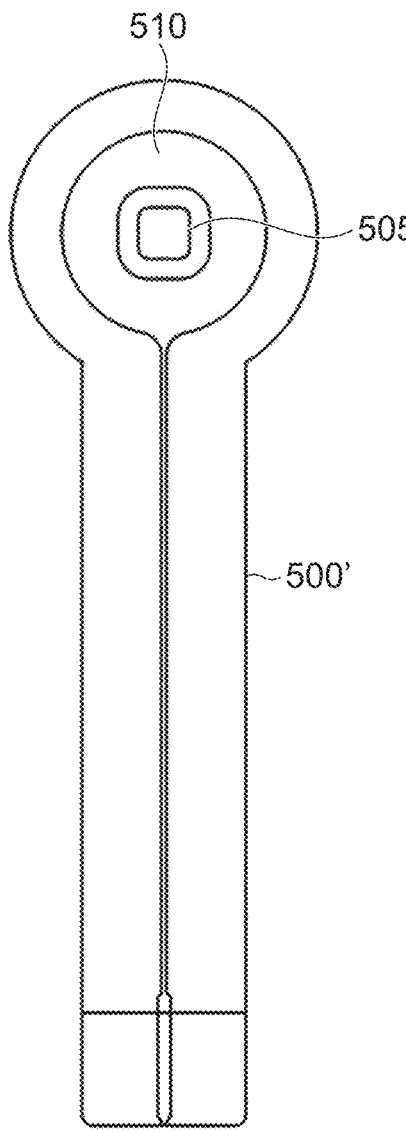
FIG. 4 is a diagram showing a configuration of a button flexible circuit board according to a prior art.
Figure 5:
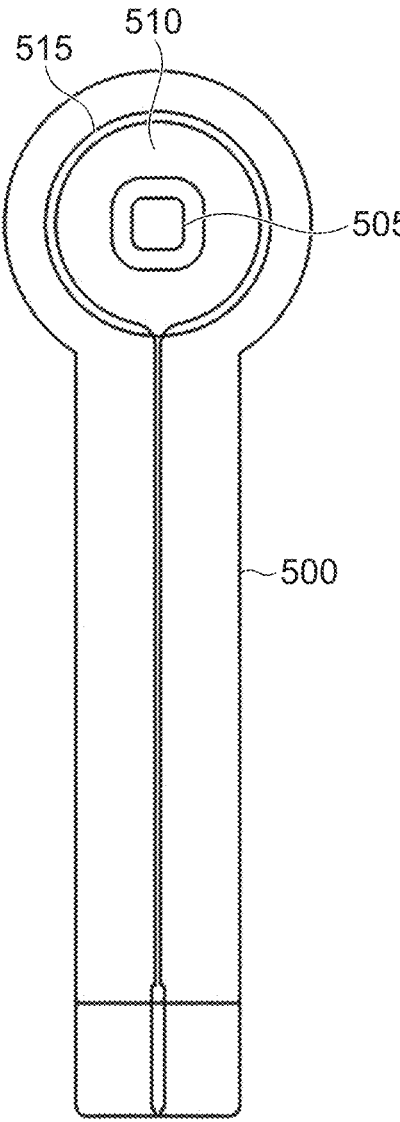
FIG. 5 is a diagram showing a configuration of a button flexible circuit board according to the first embodiment of the present invention.

FIG. 4 is a diagram showing a configuration of the button flexible circuit board 500' according to the prior art. FIG. 5 is a diagram showing a configuration of the button flexible circuit board 500 according to the first embodiment.

The button flexible circuit board 500' and the button flexible circuit board 500 are the same in that a flexible hole 505 and the electrode pattern 510 are formed thereon. The button flexible circuit board 500 according to the first embodiment further includes a pattern exposure portion 515 formed thereon, which is different from the button flexible circuit board 500' of the prior art.

The flexible hole 505 positions the button flexible circuit board 500 with respect to the key top 410, by the key top boss 412 being inserted into the flexible hole 505.

The electrode pattern 510 (movable electrode) is a pattern formed of a copper foil, and can be displaced according to the displacement of the key top 410. The button flexible circuit board 500, particularly the electrode pattern 510, is electrically connected to the electronic substrate 800 as shown in FIGS. 2A and 2B. On the electronic substrate 800, a capacitance sensor 850 (detection unit: FIG. 3A), which is a capacitance detection sensor, is mounted. With this configuration, when a conductive member approaches or leaves to or from the button flexible circuit board 500, the capacitance sensor 850 detects the amount of change in the charge stored in the electrode pattern 510. In the button flexible circuit board 500 according to the present embodiment, the area is designed to be large in a portion corresponding to the back surface of the key top 410, so that the value of the capacitance greatly changes by the input operation to the operation unit 400.

The detection result by the capacitance sensor 850 is input to a program stored in the electronic apparatus 100, whereby the presence or absence of the operation on the operation unit 400 is determined.

The difference between the button flexible circuit board 500' (FIG. 4) according to the prior art and the button flexible circuit board 500 (FIG. 5) according to the present embodiment is the configuration of the surface of the electrode pattern 510 on the receiving sheet metal 700 side.

In the button flexible circuit board 500' (FIG. 4) according to the prior art, the surface of the electrode pattern 510 on the receiving sheet metal 700 side is insulated by laminating the entire the said surface with polyimide. On the other hand, in the button flexible circuit board 500 (FIG. 5) according to the present embodiment, there is an opening in polyimide for laminating the surface of the electrode pattern 510 on the side of the receiving sheet metal 700, which sets the pattern exposure portion 515.

An effect of this configuration difference will be described later.

Next, with reference to FIGS. 6A and 6B, a difference between an operation detection method in a case where the button flexible circuit board 500' according to the prior art is used as the button flexible circuit board of the operation unit 400 and an operation detection method in a case where the button flexible circuit board 500 according to the present embodiment is used as the button flexible circuit board of the operation unit 400 will be described.

Figure 6A:
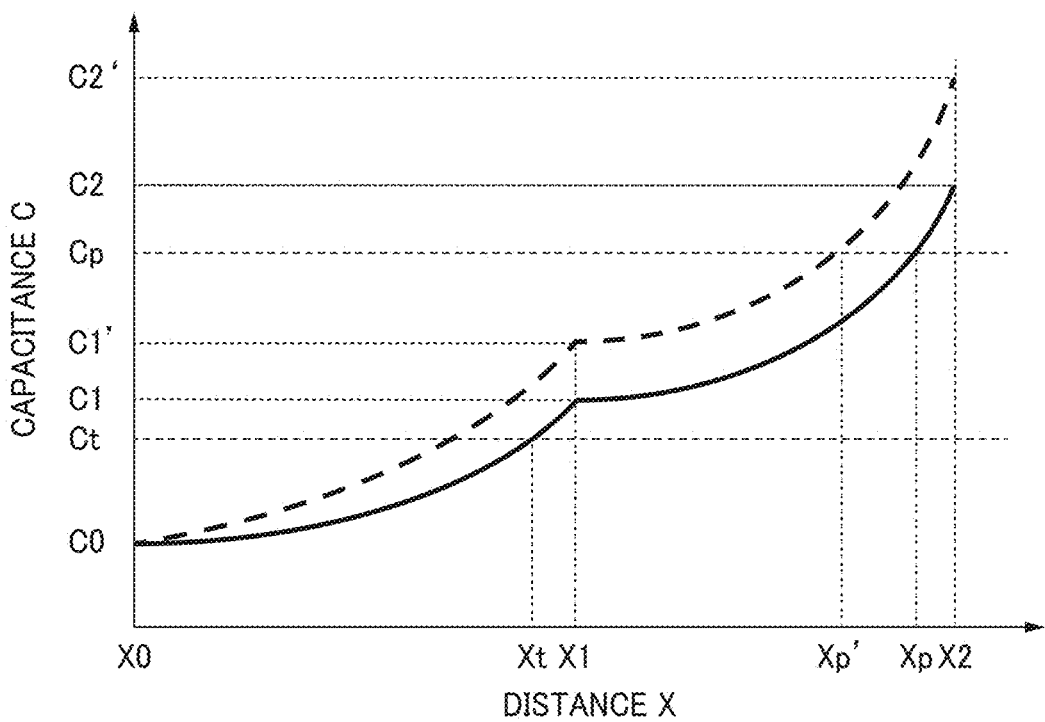
FIGS. 6A and 6B are graphs showing changes in capacitance generated in an electrode pattern when a user operates the operation unit with a finger.
Figure 6B:
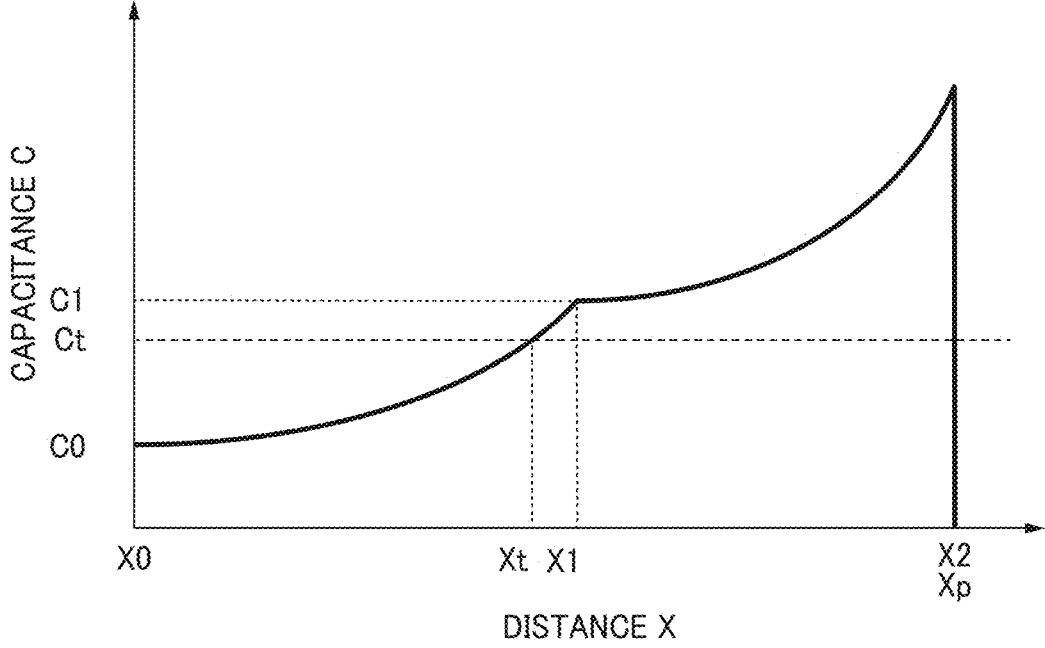

FIGS. 6A and 6B are graphs showing changes in capacitance generated in the electrode pattern 510 when the user operates the operation unit 400 with a finger. FIG. 6A shows a graph for a case where the button flexible circuit board 500' according to the prior art is used as the button flexible circuit board of the operation unit 400. FIG. 6B shows a graph for a case where the button flexible circuit board 500 according to the present embodiment is used as the button flexible circuit board of operation unit 400.

In each of the graphs in FIGS. 6A and 6B, the horizontal axis represents the distance X between the user's finger (detected object) and the receiving sheet metal 700, wherein the further to the right, the closer the finger approaches to the receiving sheet metal 700.

The user's finger (detected object) approaches the key top 410 from a state of being away from the key top 410 (X=X0). When the user's finger touches the key top 410 (X=X1), the user's finger and the key top 410 move together, and stop moving when the key top 410 comes into contact with the receiving sheet metal 700 (X=X2).

In each of the graphs in FIGS. 6A and 6B, the vertical axis represents the capacitance value C measured by the capacitance sensor 850 as the distance X changes. In general, when a value of capacitance is C, an electrode area is S, a distance to a nearby object is D, and a dielectric constant (air) is ε, the relation can be expressed as C=ε·S/D.

Therefore, as shown in FIG. 2A, the capacitance of the electrode pattern 510 increases in the process (X=X0 to X1) in which the user's finger that is grounded approaches and comes into contact with the key top 410 of the operation unit 400. In the process until the user's finger further presses the key top 410 and the key top 410 comes into contact with the receiving sheet metal 700 (X=X1 to X2) (FIG. 2B), the electrode pattern 510 and the receiving sheet metal 700 are close to each other, that is, the distance between the electrode pattern 510 and the receiving sheet metal 700 is small, and the capacitance of the electrode pattern 510 increases.

In the button flexible circuit board 500' according to the prior art, as described in the description of FIG. 4, the electrode pattern 510 which is a movable electrode and the receiving sheet metal 700 which is a fixed electrode are insulated from each other. Therefore, the value C of the capacitance in the case of using the button flexible circuit board 500' according to the prior art as the button flexible circuit board of the operation unit 400 changes as shown in the graph of FIG. 6A.

Hereinafter, how the capacitance value C changes along the approach of the user's finger in a case where the button flexible circuit board 500' according to the prior art is used for the operation unit 400 will be sequentially described with reference to FIG. 6A.

In the state of the distance X=X0, the user's finger is sufficiently away from the key top 410, and the capacitance value C detected by the capacitance sensor 850 is the initial value C0. From this state, as the user's finger approaches the key top 410 and the electrode pattern 510 arranged on the back side of the key top 410, the capacitance value C increases as described above.

When the distance X=X1, the user's finger touches the key top 410. A value of capacitance (capacitance at contact) at this time is C1. In the electronic apparatus 100, a threshold value Ct (approach threshold value: C0<Ct<C1) is set. When the capacitance sensor 850 detects that the capacitance value C has reached the threshold value Ct (alternatively, detects that the capacitance value C becomes equal to or larger than the threshold value Ct), the CPU 100a determines that the touch operation on the operation unit 400 has been performed. At this time, the CPU 100a performs a first control of the electronic apparatus 100. The position of the user's finger when the capacitance value C reaches the threshold value Ct is defined as Xt. At this time, an icon indicating that the touch operation has been performed may be displayed on the display device 300. Furthermore, for example, in a case where the operation unit 400 is a shutter release button of the camera, the CPU 100a determines that a half-press operation has been performed on the shutter release button when the distance X=X1, and executes, as the first control, various types of processing to be executed in response to the half-press operation, such as autofocus (AF) processing. At this time, an icon indicating that the AF process or the like is being performed may be displayed on the display device 300.

Thereafter, when the user's finger further presses the key top 410, the electrode pattern 510 approaches the receiving sheet metal 700, and the capacitance value C further increases.

When the distance X=X2, in the case of the prior art, as shown in FIG. 6A, the button flexible circuit board 500' comes in contact with the receiving sheet metal 700, and the capacitance value C becomes C2. In the electronic apparatus 100, the threshold value Cp (C1<Cp<C2) is set. When the capacitance sensor 850 detects that the capacitance value C has reached Cp, the CPU 100a determines that the pressing operation on the operation unit 400 has been performed. At this time, the CPU 100a performs a second control of the electronic apparatus 100. The position of the user's finger when the capacitance value C reaches Cp is defined as Xp. At the time of this pressing operation, tactile feedback is generated as the key rubber 450 deforms, and afterwards when the user's finger further presses the key top 410, the tactile feedback is given to the user's finger. Furthermore, for example, in a case where the operation unit 400 is a shutter release button of a camera, the CPU 100a determines, when the distance X=Xp, that a full-press operation on the shutter release button has been performed, and executes an image pickup process as the second control.

Here, it is needed to set a larger difference between the capacitances C1 and Cp at the time of contact between the key top 410 and the user's finger as much as possible so that the CPU 100a can reliably determine whether a touch operation or a pressing operation is performed on the operation unit 400.

On the other hand, the capacitance value C1 and the capacitance value C2 change depending on how the user's finger touches the key top 410. For example, the larger the contact area of the user's finger with respect to the key top 410, the higher the values of C1 and C2.

The broken line in FIG. 6A indicates changes in capacitance in a case where the contact area of the user's finger with respect to the key top 410 is larger than that in the case indicated by the solid line in FIG. 6A.

In the case indicated by the broken line in FIG. 6A, the capacitance when the key top 410 comes in contact with the user's finger (X=X1) is C1' (>C1), and the capacitance when the key top 410 comes in contact with the receiving sheet metal 700 (X=X2) is C2' (>C2). Here, there is a case where a sufficient difference between C1' and Cp cannot be set depending on a restriction due to its shape and/or a restriction due to its material of each component of the operation unit 400. In this case, if the user presses in the key top 410 even a little at the time of the touch operation on the operation unit 400, the capacitance detected by the capacitance sensor 850 exceeds Cp, and the electronic apparatus 100 erroneously detects that the pressing operation has been performed.

In addition, in the case indicated by the broken line in FIG. 6A, the position (pressing operation detection position) Xp' at which the capacitance becomes the threshold value Cp comes before the pressing operation detection position Xp of the case indicated by the solid line in FIG. 6A. That is, the pressing operation detection position varies depending on the contact area between the key top 410 and the user's finger. Therefore, it is disadvantageous in a case where accuracy is required at the timing when the pressing operation is detected. For example, in a case where the operation unit 400 is a shutter release button of a camera, the larger the contact area of the user's finger, the earlier the CPU 100a determines that a pressing operation (a full-press operation on the shutter release button) on the operation unit 400 has been performed. If the timing at which the CPU 100a determines that the full-press operation has been performed is early, the key rubber 450 may not be deformed to such an extent as to generate tactile feedback. In such a case, the tactile feedback is not given to the finger, and there occurs a problem that the image pickup is performed at the timing when the user thinks that "the key top 410 has to be pressed a little more to complete a full-press operation".

Next, with reference to FIG. 6B, how the capacitance C changes along the approach of the user's finger in a case where the button flexible circuit board 500 according to the present embodiment is used for the operation unit 400 will be sequentially described.

As described above with reference to FIG. 5, the button flexible circuit board 500 according to the present embodiment has, on the surface on the receiving sheet metal 700 side, the pattern exposure portion 515 in which the electrode pattern 510 is exposed. Therefore, when the button flexible circuit board 500 comes in contact with the receiving sheet metal 700, the receiving sheet metal 700 and the electrode pattern 510 are short-circuited (conductively contacted), and the capacitance value C becomes unmeasurable. Therefore, the capacitance value C in a case where the button flexible circuit board 500 according to the present embodiment is used as the button flexible circuit board of the operation unit 400 changes as shown in the graph of FIG. 6B. As described above, the present embodiment is characterized in that a short circuit occurs when the pattern exposure portion 515 and the receiving sheet metal 700 come into contact with each other. Note that the present invention is not limited to the configuration described above, and any configuration can be adopted as long as a short circuit occurs when the button flexible circuit board 500 comes into contact with the receiving sheet metal 700.

The change in the capacitance value C from the state in which the user's finger is sufficiently separated from the key top 410 to the state in which the user's finger comes into contact with the key top 410 is similar to that for the case where the button flexible circuit board 500 according to the prior art is used as the operation unit 400 described with reference to FIG. 6A. In other words, the initial value of the capacitance is C0, and when the capacitance value C exceeds the threshold value Ct, the CPU 100a determines that the touch operation on the operation unit 400 has been performed.

Thereafter, when the user's finger further presses the key top 410, the distance between the electrode pattern 510 and the receiving sheet metal 700 becomes smaller and the capacitance value C further increases. When the electrode pattern 510 and the receiving sheet metal 700 further approach each other and the distance X becomes X=X2, the button flexible circuit board 500 comes into contact with the receiving sheet metal 700. At this time, the receiving sheet metal 700 and the electrode pattern 510 are short-circuited, and the capacitance becomes unmeasurable. In the electronic apparatus 100 according to the present invention, when this state (the state in which the receiving sheet metal 700 and the electrode pattern 510 are short-circuited) is detected by the capacitance sensor 850, the CPU 100a determines that the pressing operation on the operation unit 400 is performed by the user. In other words, according to the present embodiment, even if the threshold value Cp is not set, the CPU 100a can determine that the pressing operation has been performed when the button flexible circuit board 500 comes into contact with the receiving sheet metal 700 by the pressing of the key top 410 and the capacitance sensor 850 detects the above-mentioned short circuit. Therefore, erroneous detection regarding the pressing operation on the operation unit 400 is reduced, and the accuracy of the timing of detecting the pressing operation is improved.

It should be noted that the pattern exposure portion 515 is preferably provided near the center of the back of the key top 410 so that the pattern exposure portion 515 and the receiving sheet metal 700 reliably contact with each other when the button flexible circuit board 500 comes into contact with the receiving sheet metal 700. In the receiving sheet metal 700, a sheet metal protrusion 715 (protrusion) is preferably formed at a portion facing the pattern exposure portion 515.

As described above, in the electronic apparatus 100, when the CPU 100a determines that a touch operation or a pressing operation has been performed on the operation unit 400, the electronic apparatus 100 executes corresponding control according to each operation.

For example, in a case where the electronic apparatus 100 is an electronic image pickup apparatus, the electronic apparatus 100 may be configured such that the exposure value is changed when the user turns the dial 350 while performing a touch operation on the operation unit 400, and the ISO value is changed when the user turns the dial 350 while performing a pressing operation on the operation unit 400. Further, the electronic apparatus 100 may be configured such that when the user touches a live view screen on the display device 300 while performing a touch operation on the operation unit 400, an AF position is changed to the position touched by the user in the live view screen, and an AF mode change operation screen is displayed on the display device 300 when the user performs a pressing operation on the operation unit 400. As described above, the operation unit 400 can be used in various ways.

Hereinafter, an operation unit 400-2 of an electronic apparatus 100-2 according to a second embodiment of the present invention will be described with reference to FIGS. 7A to 7C.

Note that, for the electronic apparatus 100-2 according to the second embodiment, the same reference numerals are used for the configurations similar to those of the electronic apparatus 100 according to the first embodiment, and the description of the second embodiment duplicate with the description of the first embodiment will be omitted.

Figure 7A:
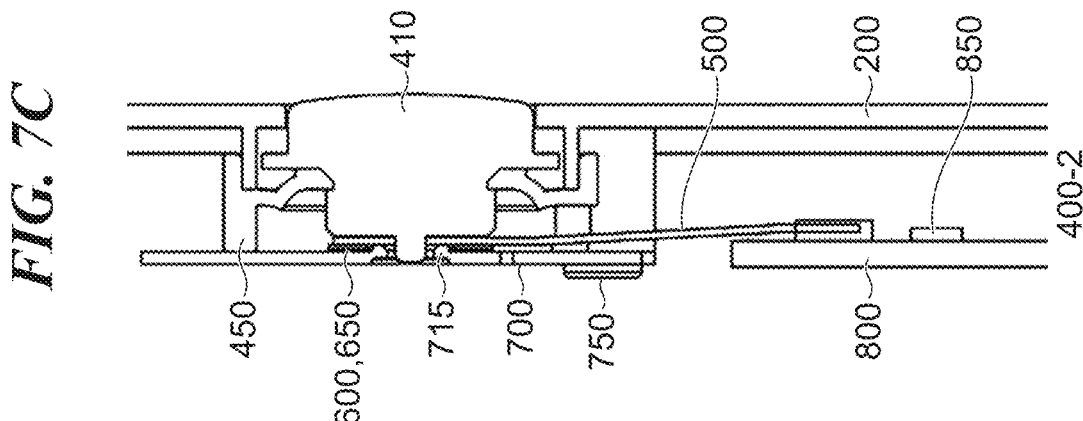
FIGS. 7A to 7C are cross-sectional diagrams showing an operation unit of an electronic apparatus according to a second embodiment of the present invention.
Figure 7B:
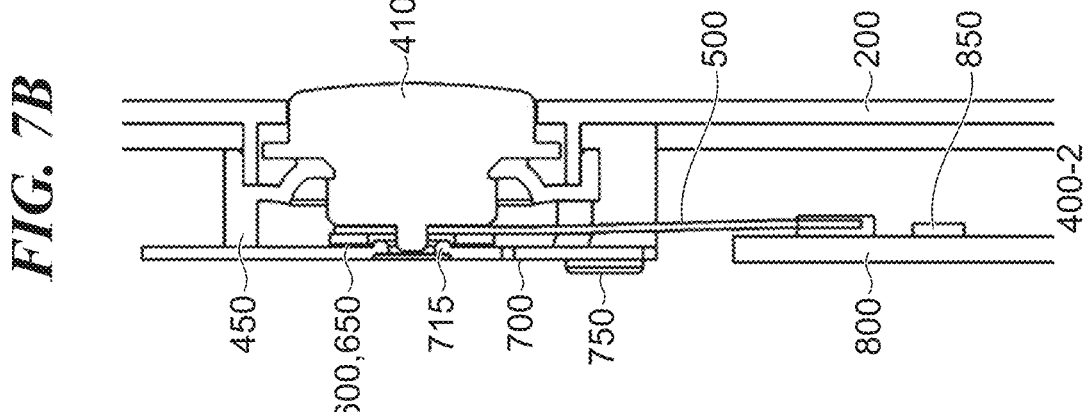
Figure 7C:
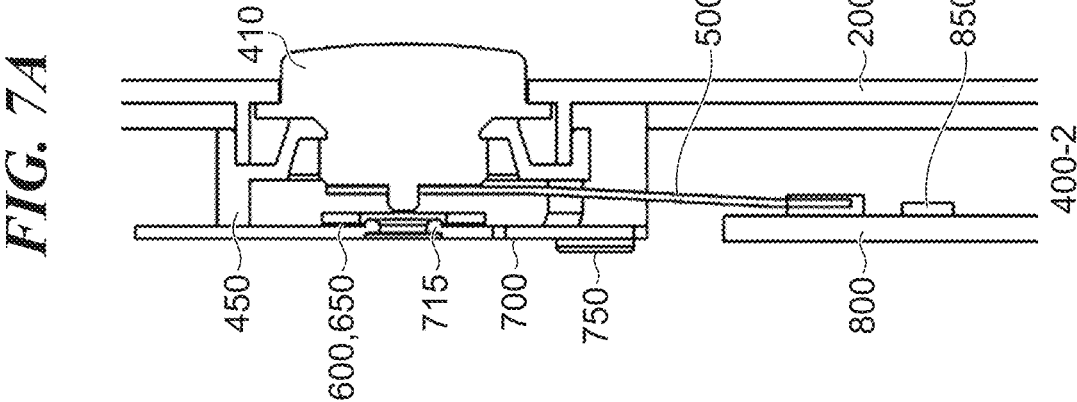

FIGS. 7A to 7C are cross-sectional diagrams showing the operation unit 400-2.

FIG. 7A is a diagram showing an operation standby state of the operation unit 400-2. In the operation unit 400-2, in addition to the components of the operation unit 400 of the first embodiment, an elastic member 600 fixed on the receiving sheet metal 700 by a double-sided tape 650 is disposed. The elastic member 600 has a donut shape, and the sheet metal protrusion 715 is exposed from the central opening of the elastic member 600.

FIG. 7B is a diagram showing a state in which the key top 410 is pushed in and the button flexible circuit board 500 come into contact with the elastic member 600.

From this state, the user can further press down the key top 410 with further force to compress the elastic member 600, and keep pressing down the key top 410 until the button flexible circuit board 500 comes into contact with the receiving sheet metal 700 as shown in FIG. 7C.

Next, with reference to FIGS. 8A and 8B, changes in value C of the capacitance generated in the electrode pattern 510 when the user operates the operation unit 400-2 with a finger will be described.

Figure 8A:
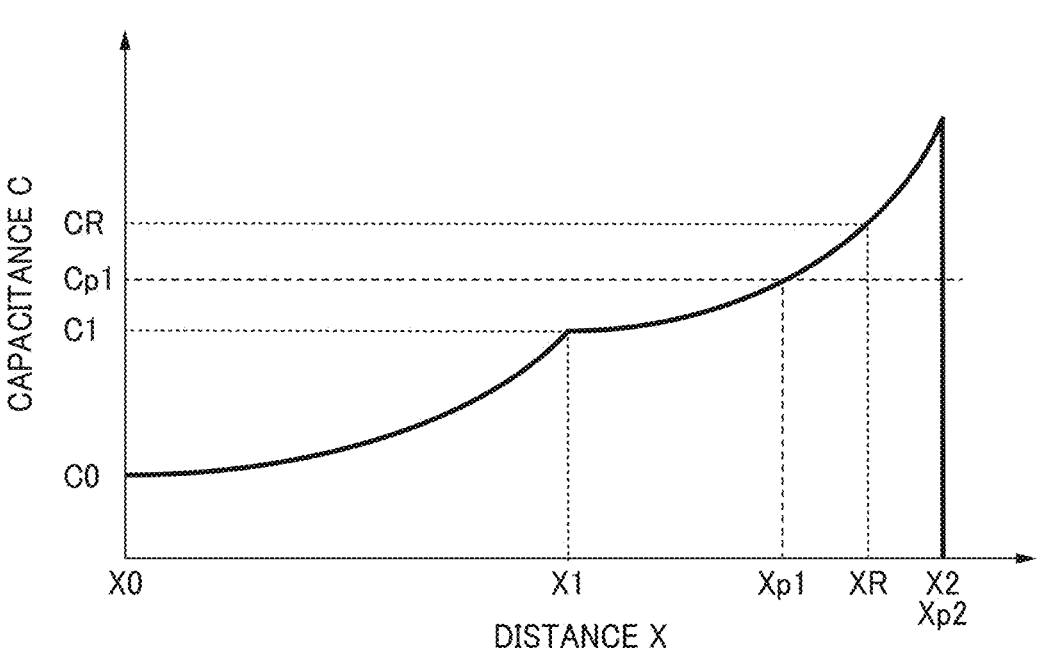
FIGS. 8A and 8B are graphs showing changes in capacitance generated in an electrode pattern when a user operates the operation unit of the electronic apparatus in FIG. 7 with a finger.

In FIG. 8A, X0, X1, C0, and C1 are similar to those described above using the graph of FIG. 6B. In other words, when the distance X=X0, the user's finger is at a position sufficiently away from the key top 410 and the receiving sheet metal 700, and C0 is a value of capacitance measured by the capacitance sensor 850 at this time (when X=X0) and is a value of capacitance in the standby state. In addition, in a case of the distance X=X1, the user's finger is at a position where the finger comes into contact with the key top 410, and C1 is a value of capacitance measured by the capacitance sensor 850 at this time (when X=X1).

In addition, in FIG. 8A, a value of a distance X when the button flexible circuit board 500, particularly the electrode pattern 510, comes in contact with the elastic member 600 is XR, and a value of capacitance measured by the capacitance sensor 850 at this time is CR.

In the electronic apparatus 100-2, a threshold value Cp1 (pressing threshold value: C1<Cp1<CR) is set. When the capacitance sensor 850 detects that the capacitance value C has reached the threshold value Cp1 (alternatively, that the capacitance value C becomes equal to or larger than the threshold value Cp1) (X=Xp1), the CPU 100a determines that the first pressing operation on the operation unit 400-2 has been performed.

Thereafter, when the user's finger further presses the key top 410, the elastic member 600 is compressed, and when X=X2, the pattern exposure portion 515 of the button flexible circuit board 500 comes into contact with the receiving sheet metal 700. When the button flexible circuit board 500 and the receiving sheet metal 700 are, as a result, short-circuited and the capacitance sensor 850 becomes unable to detect the capacitance value C (X=Xp2), the CPU

100a determines that the second pressing operation on the operation unit 400-2 has been performed.

The detection position Xp1 of the first pressing operation is a position at the time of the key top 410 being pressed in some extent from the position X1 at the time of the user's finger coming in contact with the key top 410, and the detection position Xp2 of the second pressing operation is substantially the same position as X2.

In the second embodiment, similarly to the first embodiment, two-stage detection can be performed with one operation member. In the first embodiment, when a user's finger touches the key top 410, it is determined that a touch operation has been performed on the operation unit 400; therefore, when the user unintentionally touches the key top 410, it is erroneously detected that an input operation has been performed. On the other hand, with the second embodiment, it is not determined that an input operation has been performed, until the user presses into the key top 410 with the finger to some extent. As a result, it is possible to avoid erroneous detection that may occur in the first embodiment.

However, in a case where an input operation is detected at a position at the time of the key top 410 being pressed in some extent, the capacitance threshold value needs to be raised as compared with a case where a touch on the key top 410 is detected. For this reason, in a case where the button flexible circuit board 500' according to the prior art is used as the button flexible circuit board of the operation unit 400-2, there arises a problem that a difference between the threshold value Cp1 of the first pressing operation and the threshold value Cp of the second pressing operation becomes small. On the other hand, in the configuration according to the second embodiment, the threshold value Cp is not used for the detection of the second pressing operation, and the determination condition is that the capacitance sensor 850 become unable to measure the capacitance (that is, the above-mentioned short circuit is detected), so that such problem does not occur.

The operation unit 400-2 according to the second embodiment can be used as a shutter release button of an electronic image pickup apparatus. In other words, the CPU 100a of the electronic apparatus 100-2 can use the operation unit 400-2 so as to perform focusing as the first control when determining that the first pressing operation is performed on the operation unit 400-2, and to perform image pickup processing as the second control when determining that the second pressing operation is performed on the operation unit 400-2.

Figure 8B:
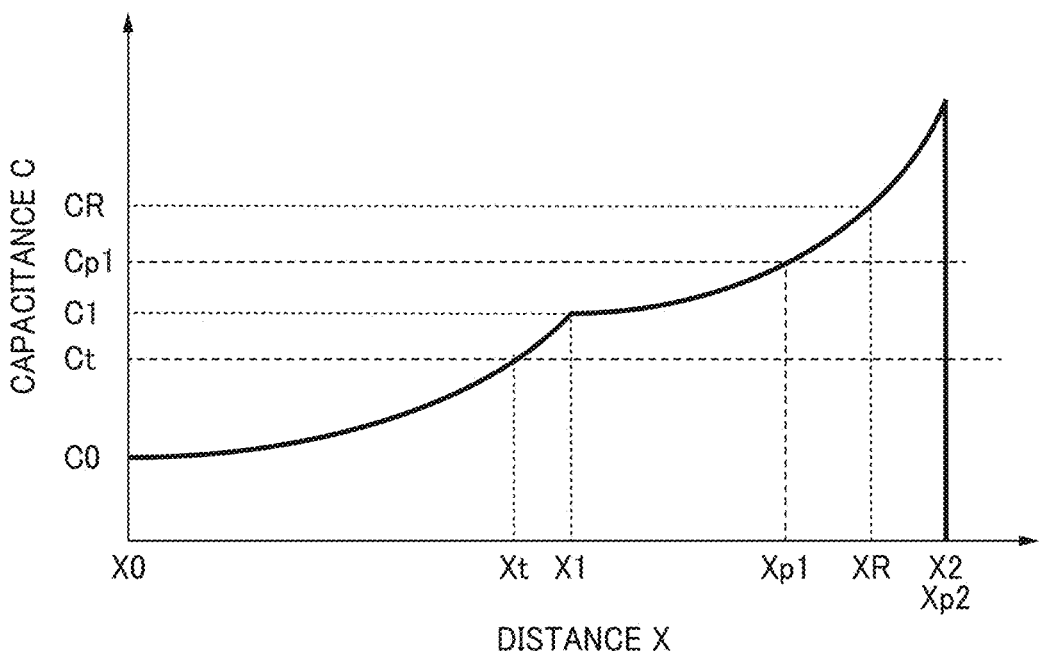

Further, as shown in FIG. 8B, three-stage input operation may be enabled with one operation member (the key top 410) by setting the approach threshold value Ct also in the second embodiment similarly to the first embodiment. In other words, also in the second embodiment, when detecting that the capacitance value C detected by the capacitance sensor 850 has reached the threshold value Ct (alternatively, that the capacitance value C becomes equal to or larger than the threshold value Ct), the CPU 100a can determine that a touch operation on the operation unit 400 has been performed. As a result, a three-stage input operation of a touch operation, a first pressing operation, and a second pressing operation can be performed with a single operation member.

With such configuration, the CPU 100a performs an image pickup standby such as releasing a sleep mode when a touch operation is performed on the operation unit 400-2 provided in the electronic image pickup apparatus, for example. In addition, for example, the CPU 100a can perform control so as to perform focusing when a first pressing operation is performed, and perform an image pickup process when a second pressing operation is performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-110139, filed Jul. 4, 2023, which is hereby incorporated by reference wherein in its entirety.

What is claimed is:

1. An electronic apparatus comprising:
an operation member configured to be displaced according to user's operation;
a movable electrode configured to be displaced according to displacement of the operation member;
a fixed electrode fixed in a vicinity of the movable electrode in a state of being electrically connected to ground;
a sensor configured to be electrically connected to the movable electrode and to detect a change in capacitance generated in the movable electrode; and
a controller configured to perform control of entire the electronic apparatus according to a detection result by the sensor,
wherein the controller switches, according to the displacement of the operation member, a state in the electronic apparatus to one of a first state in which the movable electrode and the fixed electrode are electrically separated from each other and a second state in which the movable electrode and the fixed electrode are in contact with each other in a conductive manner.

2. The electronic apparatus according to claim 1, wherein the controller
performs a first control of the electronic apparatus in a case where in the first state, a detected object approaches the operation member and the capacitance detected by the sensor becomes equal to or larger than an approach threshold value, and
performs a second control of the electronic apparatus based on a change in the capacitance detected by the sensor when the state in the electronic apparatus is switched to the second state.

3. The electronic apparatus according to claim 2, wherein the approach threshold value is smaller than a value of capacitance at contact detected by the sensor when the detected object comes into contact with the operation member.

4. The electronic apparatus according to claim 1, wherein the controller
performs a first control of the electronic apparatus when in the first state, the movable electrode approaches the fixed electrode and the capacitance detected by the sensor becomes equal to or larger than a pressing threshold value, and
performs a second control of the electronic apparatus based on a change in the capacitance detected by the sensor when the state in the electronic apparatus is switched to the second state.

5. The electronic apparatus according to claim 4, wherein the pressing threshold value is larger than a value of capacitance at contact detected by the sensor when a detected object comes into contact with the operation member.

6. The electronic apparatus according to claim 5, wherein the controller
is further configured to perform a third control of the electronic apparatus when in the first state, the detected object approaches the operation member and the capacitance detected by the sensor becomes equal to or larger than an approach threshold value.

7. The electronic apparatus according to claim 6, wherein the approach threshold value is smaller than the value of the capacitance at contact.

8. The electronic apparatus according to claim 4, wherein
the fixed electrode comprises an elastic member on a surface that faces the movable electrode, and
the pressing threshold value is less than a value of capacitance detected by the sensor when the movable electrode comes into contact with the elastic member.

9. The electronic apparatus according to claim 1, wherein the fixed electrode serves as a stopper configured to regulate a displacement amount of the operation member in a displacement direction.

10. The electronic apparatus according to claim 1, wherein the movable electrode is disposed inside of the operation member, and the fixed electrode is disposed on a surface that faces the movable electrode.

11. The electronic apparatus according to claim 10, wherein the movable electrode comprises an exposed electrode that conducts when being in contact with the fixed electrode.

12. The electronic apparatus according to claim 11, wherein the fixed electrode comprises a protrusion at a portion that faces the exposed electrode.

* * * * *